United States Patent

Brandeis

[15] 3,694,615
[45] Sept. 26, 1972

[54] WELDING CONTROL SYSTEM
[72] Inventor: Richard Brandeis, Detroit, Mich.
[73] Assignee: Weltronic Company, Southfield, Mich.
[22] Filed: April 26, 1971
[21] Appl. No.: 137,564

[52] U.S. Cl. .................219/114, 219/110, 219/111
[51] Int. Cl. ...............................................B23k 9/10
[58] Field of Search.....................219/108-110, 114; 323/22, 24 V, 24 SC, 102

[56] References Cited

UNITED STATES PATENTS 3,452,283  6/1969  O'Neil....................219/114 X
3,486,042  12/1969  Waltrous................323/22 SC Primary Examiner—J. V. Truhe
Assistant Examiner—Gale R. Peterson
Attorney—Harness, Dickey & Pierce

[57] ABSTRACT

A firing control system for controlling the application of electrical energy to a welding load including sensing the power factor of the load and generating a firing curve having a fixed slope portion and a variable slope portion, the variation in slope of the variable slope portion determining the percent heat being fed to the load, the system also includes means for disabling the power factor sensing system during the first half wave.

23 Claims, 4 Drawing Figures

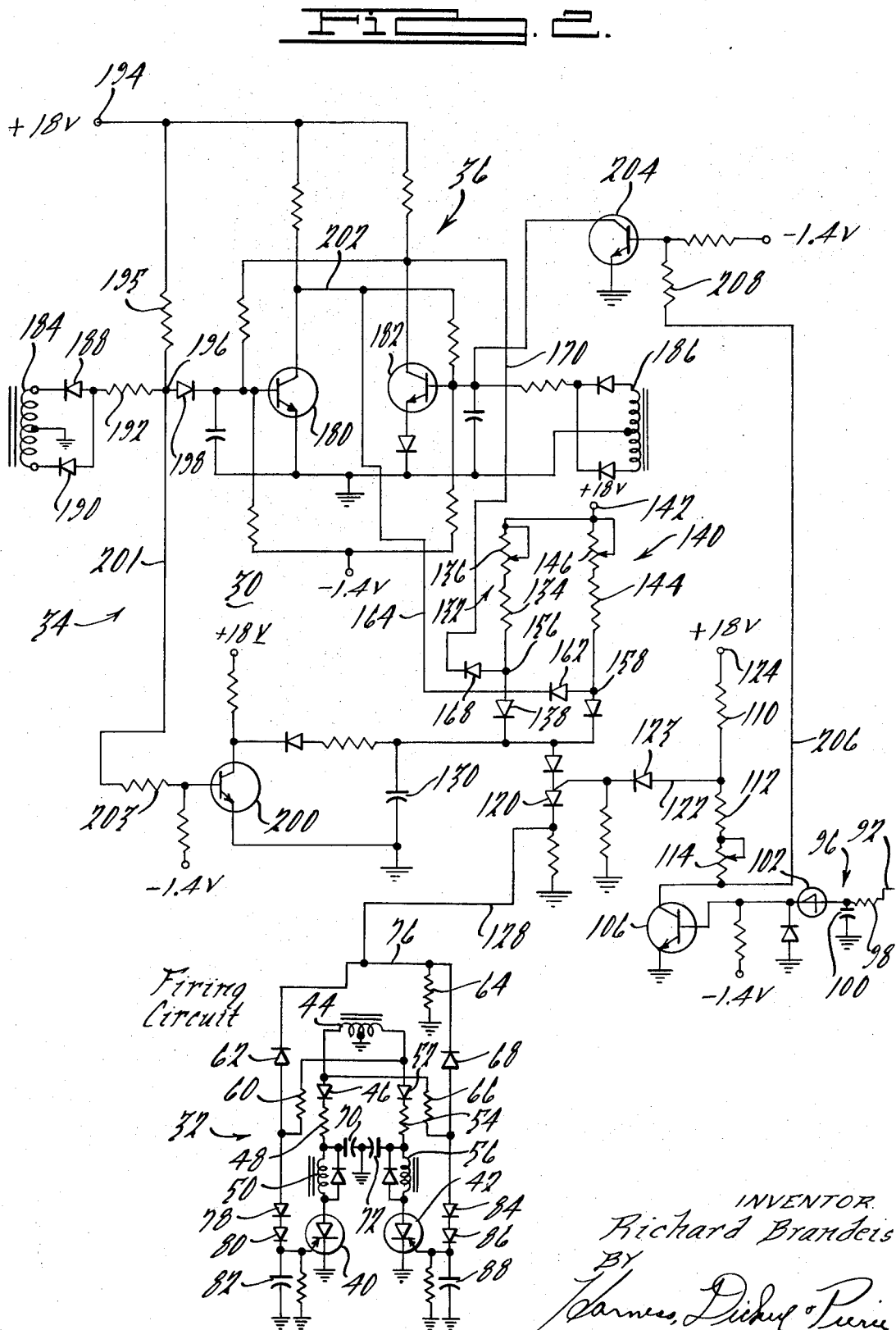

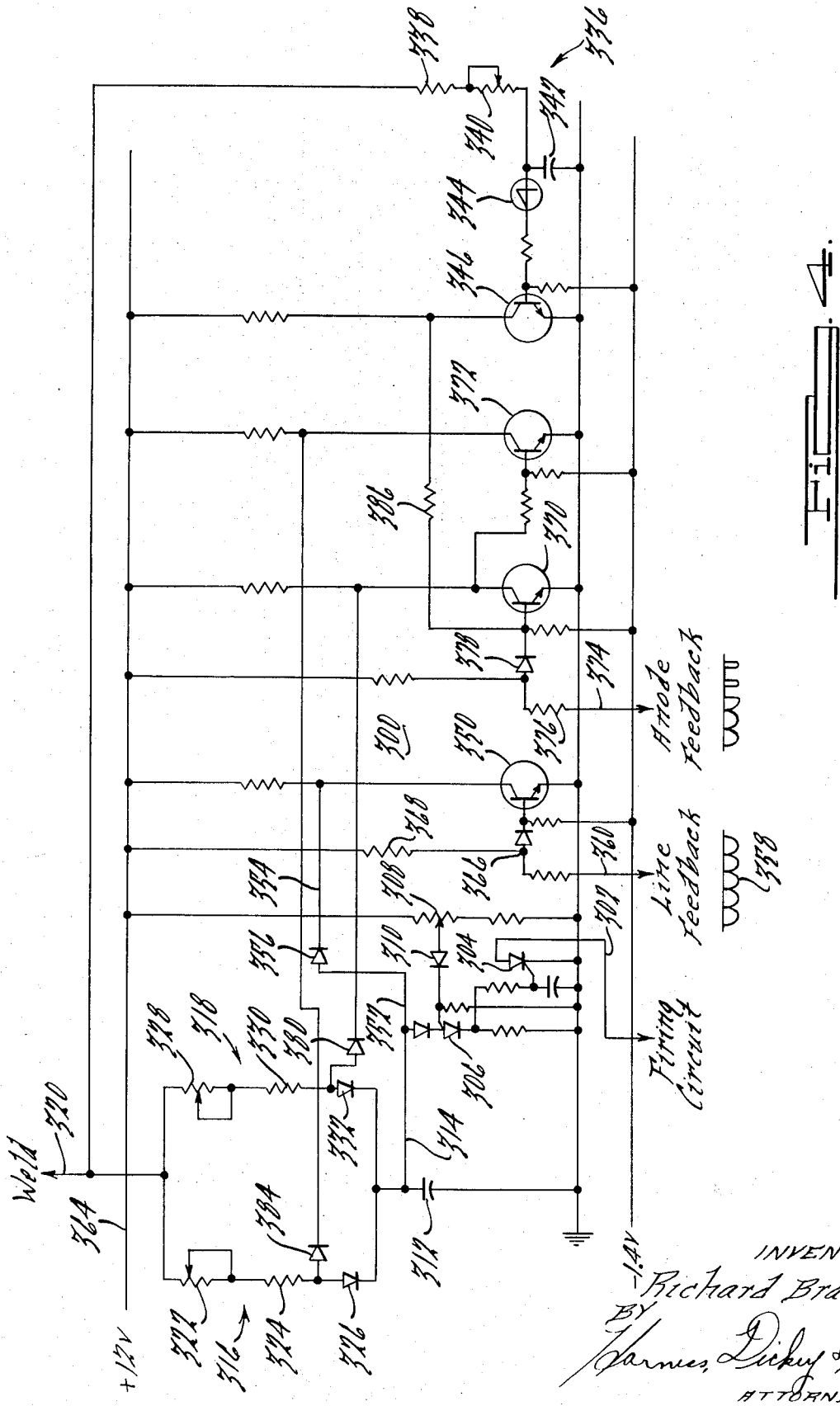

WELDING CONTROL SYSTEM

BACKGROUND AND SUMMARY OF THE DISCLOSURE

This invention relates to control apparatus and more particularly to a firing system which is suitable for use in conjunction with ignitron or controlled rectifier type devices utilized to control transfer of energy from an energy source to a workpiece to be welded. More particularly, this invention relates to the control of the first half cycle in the weld portion of the welding sequence.

It has been found that an accurate control of the heat being supplied to the load may be achieved from 50 percent to approximately 98 percent heat through a system which includes generating a straight line wave form which starts at the zero voltage point or the zero crossover point of the voltage and advances along a preselected line with a preselected slope until such time as the reversal of the voltage across the ignitrons or the achieving of a line voltage is sensed. At this time, the system generates a second straight line having a slope which is selected in accordance with the percent heat desired at the load, this percent heat being a percentage of the energy remaining under the remainder of the curve to the zero voltage crossover point. The slope of this latter straight line is increased toward infinity to achieve very nearly full (or 100 percent) heat or is decreased to a point which may coincide with the original slope to achieve approximately 20 percent heat.

Further, a reference level is generated within the system to be described which reference level is compared with the magnitude of the signal generated after the achieving of the zero current crossover point. When the magnitude of the signal represented by the second line equals or slightly exceeds the reference level, the ignitrons are fired to supply heat energy to the load.

With the system described above, the control of the percent heat is a variant which is dependent on the power factor of the load and, for a particular setting of the slope of the second line signal, will generate a preselected percent heat relative to the total energy under the envelope formed by the line voltage signal after the zero current crossover point. Thus, for a preselected slope of the second line, taking for example 75 percent heat, the second signal will equal or slightly exceed the reference level at a point which permits 75 percent of the energy level remaining under the curve after firing to be fed to the load circuit.

However, with certain prior art systems, if the percent heat were reduced to a point below 50 percent heat, the first half cycle will fire at a point earlier than the second half cycle thereby creating a flux unbalance in the welding transformer. This unbalance situation will ultimately result in saturation of the transformer, which saturation has been found to occur extremely rapidly. Thus, certain prior systems have been effectively limited in heat control ranges from 50 to 100 percent heat. This occurs due to the fact that the system cannot sense the true power factor of the load for the first half cycle, current through the load being zero.

With the system of the present invention, the user is able to control the heat below 50 percent, particularly down to 20 percent heat, and still maintain the optimum conditions that the system must not fire ahead of approximately 87 ½° for the first half cycle and the first half cycle must not fire earlier than any subsequent half cycles during the welding portion of the cycle. The 20 percent is selected as a lowest heat setting for ignitrons. It is to be understood that lower settings are possible for other control devices. Also, the system is fully phase-shift compensated to enable the system to automatically sense and compensate the reactive condition of the load to fire the ignitrons or other output devices at a point selected by the user in accordance with the desire percent heat required, this percent heat being the percentage of energy left under the curve after the reversal of current.

This phenomenon is accomplished by assuming that the load is purely reactive, the worst case, and disabling certain portions of the circuit until such time as the 87 ½° point has been reached for the first cycle. In the system of the present invention, provision is made to sense the zero voltage point and also to sense the point where the current reaches zero through the output control devices and provide a feedback signal to indicate this zero current condition. For purposes of this disclosure, this zero current condition will be referred to as a zero crossover point. Thus, with the sensing of the line voltage zero crossover and the line current zero crossover, a system is provided for automatically sensing the phase-shift of the load circuit due to the inductance thereof. The system of the present invention disables the zero current crossover feedback signal during the period that the system is not welding and has not reached the 87 ½° point of the first half wave after the weld signal has been generated. When the 87 ½° point is sensed, the circuit is again enabled to provide an extremely accurate follow-down system.

Accordingly, it is one object of the present invention to provide an improved solid state firing system for ignitrons or the like.

Another object of the present invention is to provide an improved system for controlling the operation of a welding circuit.

It is still another object of the present invention to provide an improved system for controlling the firing of output control devices in a welding system, the control circuit being fully, phase-shift compensated.

It is a further object of the present invention to provide an improved control system for a welding circuit which is fully phase-shift compensated and which permits the user to select a wide range of heats, as for example from 20 to 100 percent heat in the case of ignitron circuits.

It is still a further object of the present invention to provide an improved welding control circuit for the weld portion of a weld cycle wherein the user is capable of selecting a range of heats from approximately zero to approximately 100 percent in the case where the supply voltage to the output control devices between the source and the load is low, as for example silicon controlled rectifiers.

It is still a further object of the present invention to provide an improved line synchronizing system for use in conjunction with control circuits having automatic power factor adjust features.

It is still a further object of the present invention to provide an improved line synchronizing system for use in conjunction with automatic power factor adjust circuits having a capability of a range of percent heats in a welding system from approximately zero to approximately 100 percent.

It is still a further object of the present invention to provide an improved control system for a welding circuit which accurately controls the first half cycle of the weld portion of the sequence wherein the ignitrons or other control devices are not fired ahead of 87 ½° and wherein the first half cycle is always longer than any subsequent half cycle.

It is still a further object of the present invention to provide an improved control system for a heat control circuit in a welding system, the system utilizing the concept of assuming that the first half cycle will be fired in the case of a purely inductive load.

It is still a further object of the present invention to provide an improved control circuit for a welding system, the control circuit providing control of the flow of energy from a source to the load during the weld portion of the cycle wherein the system automatically adjusts for power factor and automatically compensates for inductive changes in the load due to loading of metal into the throat of the work clamp.

It is still a further object of the present invention to provide an improved control system for a welding portion of a welding sequence which optimizes the linearity of the system and the compensation for variations in inductive change due to throat loading.

The manner of accomplishing the foregoing objects and other objects and features of this invention may be perceived from the following description of several embodiments of the invention when read with reference to the accompanying drawings, in which:

FIG. 2 is a schematic representation of a preferred form of control circuit for a welding system in accordance with the principles of the present invention;

FIG. 4 is a schematic representation of still another modification of the control system of FIG. 2.

This invention is an improvement on the system described in copending application of George O'Neal, Jr., Ser. No. 58,126, filed July 24, 1970, and assigned to the assignee of the instant invention.

In the system of the aforementioned copending application, the system has been evolved to sense the zero voltage crossover point and also the zero current crossover point to control the charging of a capacitor in accordance with a preslope portion and a heat control portion. However, before the ignitrons have been fired, the load circuit will appear to be a resistive load, thus causing the load sensing circuit to react in accordance with a substantially resistive load. When the second half cycle is fired, the circuit will have current flowing through the load thereby establishing the true inductive character of the load. Thus, the inductive characteristic of the load will be exhibited in the second half cycle but not the first. Under certain circumstances, this will cause the first half cycle to fire earlier than the second half cycle thereby creating a magnetic unbalance in the transformer core.

The system of the present invention assumes that the load will be purely inductive for the first half cycle of the weld portion of the sequence and accordingly controls the firing of the first half wave in accordance with that assumption. Under these circumstances, the first half wave will always fire later than the second half wave and a substantially linear, heat control followdown system is provided which permits the user to select substantially a full range of heats while avoiding saturation of the transformer due to unbalance.

Figure 1:
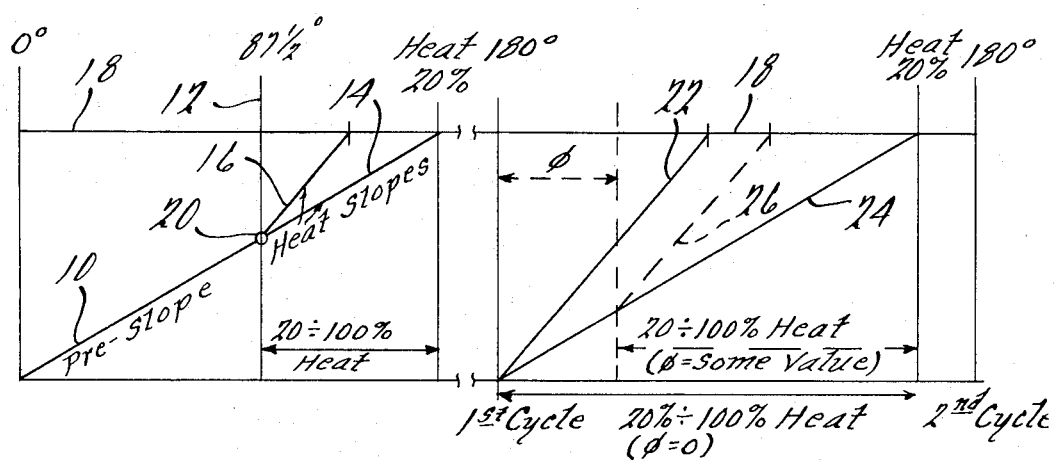
FIG. 1 is a graph illustrating the phase-angle relationship of several percent heat settings and the voltage versus time relationship of the timing pulse for the system of the present invention.

Referring now to FIG. 1, there is illustrated a composite graph which may be seen to illustrate the principles of the present invention. Referring particularly to the left side of the graph, if the load is a purely inductive load or is assumed to a purely inductive load, the voltage will cross the zero voltage line at zero angle and the current will cross the zero current line at an angle which is approximately 90° later. For purposes of simplicity, it will be assumed that the worst inductive load possible would occur in circuits of the type to be described at 87 ½°, the firing angle normally selected as a minimum firing angle for the first half wave of the welding portion of the sequence.

In this case, it will be seen that the system of the present invention causes a capacitor to charge along a preslope curve 10 until such time as the current is assumed to cross the zero line. This occurs at the line designated 12 and a second RC timing circuit is selected to charge the capacitor along a slope which is selected in accordance with the particular heat desired. If the desired heat is to be 20 percent heat the capacitor will charge along a curve designated by reference numeral 14. If some greater heat is selected, for example, 60 percent heat, the capacitor will charge along a curve designated by reference numeral 16. When a preselected voltage level is achieved on the capacitor, as for example a voltage level represented by line 18, the output control devices in the load circuit will be fired to feed energy to the load.

As is seen from the foregoing description, the inductive reactiveness of the load circuit can never be greater than that assumed at a 90° point or 87 ½ degrees. Thus, all the actual inductive characteristics of the load will be somewhat less than that assumed and the second half wave will charge along a preslope line identical to that described in conjunction with reference numeral 10 but will terminate at a point equal to or less than the termination point designated by reference numeral 20. The heat control portion of the circuit will then take over to charge the capacitor along the line parallel to the line 14 in the case of 20 percent heat or parallel to line 16 in the case of 60 percent heat. The capacitor will then charge toward the line 18 and will fire the output control devices when a voltage corresponding to line 18 is achieved. It is readily apparent that this firing angle will always be prior to the firing angle selected for the first half wave.

Referring now to the right portion of FIG. 1 there is illustrated an example of a first half cycle charging path for arbitrarily selected percent heats of approximately 50 percent heat, in the case of curve 22, and 20 percent heat in the case of curve 24. It will be noted that both curves start at zero phase angle and proceed toward the charge level defined by line 18.

Assuming, that curve 22 represents the first half cycle, it is noted that the curve starts at zero phase angle and reaches line 18 at approximately 50 percent heat. Thus, the circuit would fire for the first half cycle at 50 percent heat. When the second half cycle starts, there is a phase angle associated with the inductive reactance of the circuit thus providing a curve which charges along line 24 until the phase angle point is reached and then charges along line 26 corresponding to the particular percent heat selected. It will be noted that the curve 26 is parallel to the curve 22. Thus, the curve 26 reaches line 18 at a point later in the point at which curve 22 reached line 18. Thus, the second cycle would fire later than the first cycle. Under these conditions, an unbalanced condition would occur in the transformer.

Referring now to FIG. 2, there is illustrated a heat control and firing circuit 30 which is adapted to control the firing of the output ignitrons (not shown) during the weld portion of the cycle. Specifically, the circuit 30 includes an output firing circuit 32, the control of which is provided by a heat control circuit 34. Control of the operation of the heat control circuit is provided by a flip-flop 36, the flip-flop being utilized to select the preslope portion of the timing circuit between the zero voltage crossover point and to switch to select the heat control portion of the circuit after the 87 ½° point has been reached in the case of the first half cycle and after the zero current crossover point for the second and subsequent half cycles. The concept of the preslope and heat-control slope is fully explained in the above referenced copending application and will become apparent from this specification.

As was explained above in conjunction with the description of FIG. 1, the system of the present invention includes a heat control circuit which generates a selectably variable, precharging wave form and a heat control wave form which is generated at the time of the switching of conduction of the ignitrons to provide the heat control necessary in welding systems of this type. Particularly, the system of the present invention generates a straight line wave form which starts at the zero voltage point and advances along a preselected line with a preset slope (generally a slope equivalent to approximately 20 percent heat) until such time as the reversal of the current across the ignitrons is sensed. At this time, the system generates a second straight line having a slope which is selected in accordance with the percent heat desired at the load. The slope of this latter line may be variably increased or decreased to achieve a range of heat from approximately 100 percent to zero heat respectively.

Referring particularly to the firing circuit 32 is seen that a pair of controlled rectifiers 40, 42 are connected between ground potential at the cathodes thereof and the opposite ends of a center tapped secondary winding 44 through a circuit including a diode 46, a resistor 48 and a pulse transformer 50. The control rectifier 42 is similarly connected through a diode 52, a resistor 54 and a primary winding of a second pulse transformer 56.

When a pulse signal is not being generated, the right side of the secondary winding of transformer 44 is grounded through a circuit including a resistor 60, a diode 62 and a resistor 64. Similarly, the left side of the secondary winding 44 is connected to ground through resistor 66, a diode 68 and the resistor 64. Thus, zero current is flowing through the pulse transformers 50, 56 due to the non-conduction of controlled rectifiers 40 and 42. However, a small current flows through diode 46 and resistor 48 to ground to charge a capacitor 70 and a second current path is provided through diode 52, resistor 54 to ground to charge capacitor 72. It will be noted that the capacitor 70 is charged on the opposite half cycle that capacitor 72 is charged and on the half cycle that control rectifier 40 conducts, this charging provides a sharp pulse through the pulse transformers 50, 56 as will be seen.

When it is desired to fire one of the controlled rectifiers 40, 42, the potential of a conductor 76 is raised sufficiently to back bias diodes 62, 68, This permits current to flow through the controlled rectifier 40 or 42 depending on the polarity of the line voltage being sensed by secondary winding 44. However, on opposite half cycles, current flows through the pair of diodes 78, 80 to charge a capacitor 82 to enable the controlled rectifier 40 by placing a positive signal on the gate electrode thereof. A similar situation exists on the other half cycle when current flows through diodes 84, 86 to charge capacitor 88.

When the diodes 62, 68 are back biased, and assuming the left side of secondary winding 44 is positive, current will flow through diode 46, resistor 48, pulse transformer 50 and controlled rectifier 40 to ground. Also, the capacitor 70 will discharge through the pulse transformer 50 to provide an additional current pulse. A similar situation occurs on the opposite half cycle through pulse transformer 56 and controlled rectifier 42. Thus, firing pulses are generated in the primary windings 50, 56.

Referring now to the heat control portion of the circuit 34, there is provided a weld signal on an input conductor 92, this weld signal being generated in the normal sequencing circuit provided with systems of this type to sequence the system through squeeze, weld, hold and off. This input signal is initiated at the start of the weld portion of the cycle and is fed through an RC timing circuit 96 and a resistor 98 to charge a capacitor 100. The RC time constant of the resistors 96, 98 and capacitor 100 provides the delayed firing for the first half cycle common in systems of this type. Normally, the firing of the first cycle of the weld portion of the cycle is delayed by 87 ½°.

When the voltage on capacitor 100 is sufficient to breakdown a four-layer voltage responsive device 102, current flows from the capacitor to a control transistor 106 through the voltage responsive device 102. The transistor 106 is connected in controlling relation with a voltage divider circuit including a pair of resistors 110, 112 and a potentiometer 114. The interconnection between the resistor 110 and the voltage divider 114 is connected to the control electrode of a programmable unijunction transistor 120 through a conductor 122 and a diode 123. The unijunction transistor will conduct when the cathode voltage exceeds the gate voltage, as is common in devices of this type. Prior to the 87 ½° point, the conductor 122 is maintained at a potential very near the potential (18 volts) of input terminal 124, which potential is greater than the possible potential at the cathode electrode of the unijunction transistor 120. However, when the transistor 106 conducts, the voltage on conductor 122 is lowered sufficiently to enable the unijunction transistor 120 to conduct if a proper voltage is present at the cathode electrode. The evolution of this proper voltage will be described hereinafter. The conduction of transistor 120 generates a firing pulse on conductor 128 for use by circuit 32 as described above to control the firing pulses.

The conduction of the unijunction transistor 120 is controlled by the charge on a capacitor 130, the charge on the capacitor being derived from two sources, namely, a presetable fixed circuit 132 including a resistor 134 and a potentiometer 136. These two elements 134, 136 provide the resistance for the RC timing circuit, including capacitor 130, which generates the initial or precharge portion of the timing cycle, the current flowing through diode 138 to charge the capacitor 130. Upon reaching the changeover in conduction of the ignitrons, the circuit 132 is switched out of circuit with the capacitor 130 and a heat control circuit 140 is interconnected to charge the capacitor 130. The circuit 140 includes a source of direct current potential at 142, a resistor 144 and a potentiometer 146, the potentiometer 146 corresponding to the heat control resistor which may be adjusted in accordance with the percent heat desired by the operator.

Control of which charging circuit, the preslope circuit 132 or the heat control circuit 140, is being utilized is controlled by means of the flip-flop circuit 36 whereby the node 156 or node 158 is clamped to ground during the period that the selective circuit is not to be utilized. For example, when the initial precharge portion of the weld cycle is in operation, the node 158 is clamped to ground through a diode 162 and a conductor 164 by means of the circuit 36. On the other hand, when the actual heat control is being utilized, the node 156 is clamped to ground through a diode 168 and a conductor 170.

The system with which the present invention is associated includes a circuit for sensing when the line voltage crosses zero and when the current crosses the zero point. This latter current condition is sensed by a transformer connected across the control devices, either ignitrons or silicon controlled rectifiers, to sense the change in polarity across the ignitron to signal the extinction of one ignitron which was previously conducting, thus indicating a reversal in polarity of the line current through the load. As is the case with ignitrons and controlled rectifiers, the opposite control device to that which was conducting previously, will not conduct until such time as the line current crosses the zero point. In this way, a ready indication of the zero crossover point is provided.

The grounding of the two conductors is controlled by the flip-flop circuit 36 which includes a pair of transistors 180, 182 connected in the conventional flip-flop configuration. The flip-flop includes a first input from the secondary winding 184 of a center tapped transformer which is supplied from line voltage. Also, there is a second secondary winding 186 which is also center tapped and supplied with a signal from the transformer connected across the anodes of the ignitrons as described above.

Referring particularly to the secondary winding 184, it is seen that the ends of the winding 184 are connected to a pair of diodes 188, 190 to supply the negative half cycle of the wave to a resistor 192. However, the output end of the resistor is connected to a positive source of potential at 194 through a resistor 195 to bias the node 196 such that a slight spike of voltage appears through the diode 198. This positive voltage causes the transistor 180 to conduct each time the spike appears and signal the zero voltage crossover of the line voltage wave. The conduction of 180 also turns off the transistor 182. The node 196 is also connected to the base electrode of a normally non-conducting transistor 200 through a conductor 201 and a resistor 203. It will be noted that the collector-emitter circuit of transistor 200 is connected across or in series with the capacitor 130. Thus, each time the transistor 200 conducts, the capacitor 130 is discharged and the anode of the transistor 120 is grounded. In this way, there is assurance that the programmable unijunction transistor 120 is non-conductive at the start of the half cycle and the system is line synchronized. Thus, with the transistor 180 conductive and the transistor 182 non-conductive, the potential at an output conductor 202 is very nearly ground potential thereby grounding the conductor 164. This disables the heat control circuit 140 at the time the line voltage crosses zero and before the occurrence of the 87 ½° point in the case of the first half cycle of the weld portion, and the zero current crossover point in the case of the subsequent half cycles.

On the other hand, the transistor 182 is non-conductive to raise the potential of the conductor 170 to a high positive level. This high potential back-biases diode 168 to permit the capacitor 130 to be charged through a circuit including resistors 134 and 136 and diode 138. On the other hand, when the conductive ignitron is extinguished and the switching point is reached during the second and subsequent half cycles, this signal is sensed by the transformer 186 and fed to the base electrode of the transistor 182 to cause the transistor 182 to be conductive. The conduction of transistor 182 will immediately switch transistor 180 to the non-conductive state to raise the potential of the conductor 202 to a high positive level. This high potential will cause diode 162 to be back biased to permit the circuit 140 to control the charging of the capacitor 130 through the circuit including potentiometer 146. This cycle will continue until the requisite number of counts have been achieved and the weld signal is lost from conductor 92. The loss of the weld signal will cause transistor 106 to become non-conductive to raise the gate voltage of the unijunction transistor 120. Thus, the unijunction transistor 120 is extinguished until the next heat cycle.

It will be noted that the collector electrode of transistor 106 is also connected to the base electrode of a transistor 204 by means of a conductor 206 and a resistor 208. The collector-emitter circuit of transistor 204 is connected across at base-emitter circuit of transistor 182, the transistor 182 controlling the use of the preslope circuit 132. It will be recalled, the non-conductive condition of transistor 182 back biases the diode 168 to cause capacitor 130 to be charged through the circuit including resistors 134, 136 and diode 138. Also, the non-conductive condition of transistor 182 will maintain transistor 180 in the conductive state.

Thus, with transistor 106 in the non-conductive state due to the fact that the first half cycle has not proceeded through the first 87 ½° or that the weld signal has not been generated, a positive voltage will be applied to conductor 206 to maintain transistor 204 in the conductive state. This conduction of transistor 204 will ground the base-emitter circuit of transistor 182. This condition will persist until the weld signal has been generated and 87 ½° of the first half cycle of the weld sequence has occurred.

Upon the occurrence of the 87 ½° signal, thus breaking down four-layer device 102, transistor 106 will be rendered conductive to substantially ground conductor 206. The grounding of conductor 206 will render transistor 204 non-conductive, thus causing transistor 182 to conduct. The conduction of transistor 182 will cause transistor 180 to be rendered non-conductive thus raising the potential of conductors 202 and 164 to a relatively high potential level thereby back-biasing diode 162. Thus, transistor 182 grounds the preslope circuit 132 and the non-conduction of transistor 180 enables the heat control circuit 140 to charge capacitor 130.

From the foregoing it is seen that the flip-flop circuit 36 is switched from the preslope mode to the heat control mode (switching circuits 132-134) at the 87 ½° point. Thus the circuit operates in a simulated purely inductive mode thereby "fooling" the system into believing that the load circuit is purely inductive for the first half cycle of the welding portion of the sequence. The circuit then operates normally in response to the sensing of the zero voltage crossover point by transformer secondary 184 and subsequently the zero current crossover point by transformer secondary 186. Obviously, the generation of the zero current crossover point pulse by secondary winding 186 will occur no later than the 87 ½° point and more frequently will occur before that point due to the lower true inductive characteristics of the load circuit.

Thus, the second and subsequent firing pulses will never occur earlier than the first half wave firing pulse.

Figure 3:
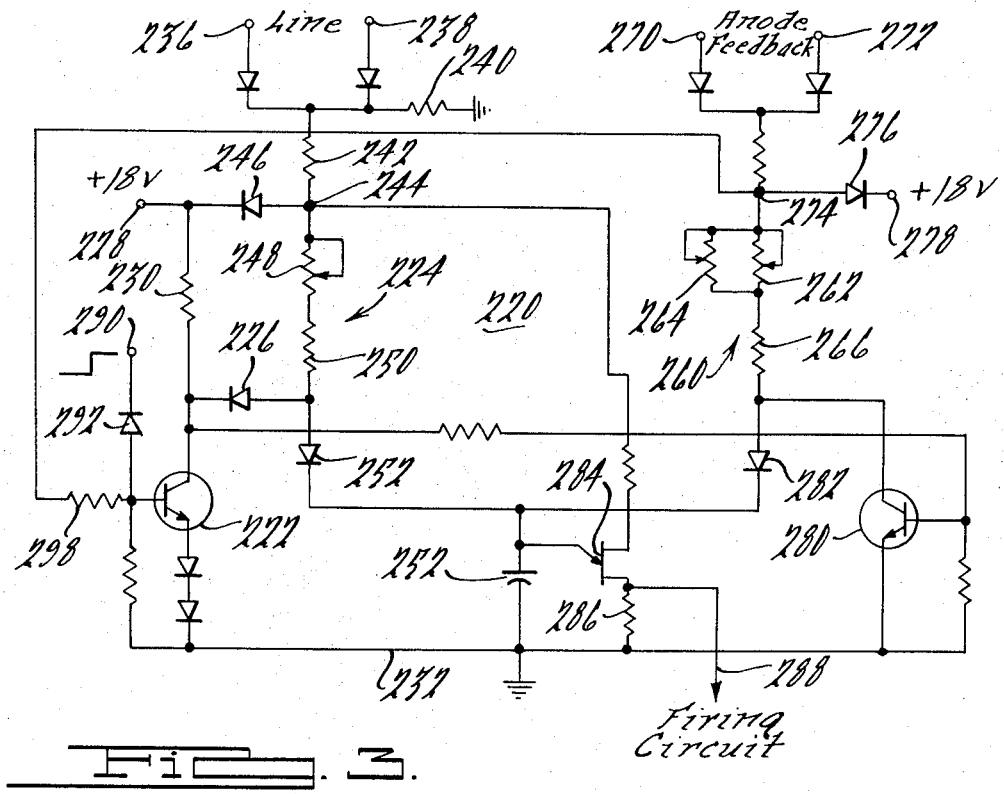
FIG. 3 is a schematic representation of a modified form of the system of FIG. 2.

Referring now to FIG. 3, there is illustrated a modified timing circuit 220 which is adapted to be utilized in conjunction with the firing circuit described in conjunction with FIG. 2. Particularly, the system includes a transistor 222 which is utilized to control the operation of a preslope timing circuit 224 which is connected to the collector-emitter circuit of transistor 222 through a diode 226. When the transistor 222 is conductive, current flows from a source of positive 18 volt potential at input terminal 228 through a resistor 230 and through the collector-emitter circuit of the transistor 222 to a line 232.

The power supply for the preslope charging circuit 224 is derived from the line voltage which appears at input terminals 236, 238, the line voltage being full-wave rectified and fed across a resistor 240. This voltage developed across resistor 240 is fed through a resistor 242 to a node 244. The node 244 is also connected to the source of 18 volt potential at 228 through a diode 246, the diode 246 and DC potential at 228 clamping the voltage at node 244 to a maximum of 18 volts. Thus, a substantially square wave of 18 volt amplitude appears at node 244.

When the transistor 222 is turned off, diode 226 is back-biased to permit current to flow through a trim resistor 248 and a main resistor 250 to charge a timing capacitor 252 through a diode 254. The RC time constant of the circuit 224 is provided by resistors 242, 248 and 250 and the capacitor is 252.

The heat control portion of the system includes a heat control resistor circuit 260 which includes an adjustable heat control resistor 262 which enables the user to select a desired percent heat, a trim resistor 264 and a fixed resistor 266. The supply for the heat control circuit 260 is provided from an anode feedback signal provided input terminals 270, 272, this signal being full-wave rectified by means of a pair of diodes. The output voltage from the full-wave rectifier is fed to a node 274, the voltage at the node 274 being clamped by means of a diode 276 and a source of 18 volt potential at 278. Thus, a substantially square wave of approximately 18 volt amplitude will appear at node 274.

As was the case with the preslope circuit, a transistor 280 is provided to control the operation of the heat control circuit. When the transistor 280 is conductive, the output of the heat control circuit is grounded through the collector-emitter circuit of the transistor 280. However, when the transistor 280 is rendered non-conductive, the capacitor 252 is charged through a circuit including the resistors 262, 264 and 266 and a diode 282. When the charge on capacitor 252 reaches sufficient magnitude to fire a unijunction transistor 284, an output pulse is developed across resistor 286 to provide an output signal to the firing circuit 32 described in conjunction with FIG. 2 by means of a conductor 288.

Referring now to the operation of transistors 222 and transistor 280, a delayed firing input signal is provided at an input terminal 290, which signal is at substantially ground potential prior to the 87 ½° point and rises to a positive potential when the 87 ½° point is achieved. When the signal at input terminal 290 is low or ground, the base electrode of transistor 222 is grounded through a diode 292. When the delayed firing signal is received at terminal 290, the base electrode of transistor 222 is unclamped from ground to permit the transistor to conduct. Thus, with the transistor 222 non-conductive, the capacitor 252 is charged from the preslope circuit 222. Upon achieving the 87 ½° point, which again assumes a purely inductive load, the transistor 222 is rendered conductive to ground or disable the preslope circuit 224.

When the transistor 222 is non-conductive, the collector electrode thereof is at a relatively high positive potential, which positive potential is fed to the base circuit of transistor 280 through a resistor 296. This high potential causes transistor 280 to conduct thereby grounding the heat control circuit 260. Upon achieving the 87 ½° delayed firing signal at terminal 290, the transistor 222 is rendered conductive which grounds the base electrode of transistor 280 to turn transistor 280 off. This non-conductive condition of transistor 280 enables the capacitor 252 to be charged through the heat control circuit 260.

For the second and subsequent half cycles, the terminal 290 remains at a high level thereby back biasing diode 292. The operation of transistor 222 is then influenced by the anode feedback signal at terminal 274, which signal is fed to the input circuit of the transistor 222 through a resistor 298 thereby resetting the transistor 222 to the conductive condition upon sensing the anode feedback signal. Thus, for the second, and subsequent half cycles, the transistor 222 will be non-conductive from the zero voltage crossover point to the point at which the line current crosses zero, at which time the transistor 222 is turned on. The conductive condition of transistor 222 then turns transistor 280 off for the remaining portion of the half wave after the zero crossover point.

Referring now to FIG. 4, there is illustrated a second modification of the circuit described above, the circuit being given reference numeral 300. Particularly, the circuit 300 is adapted to provide output firing pulses on an output conductor 302 as a result of firing a controlled rectifier 304. The firing of the controlled rectifier 304 is controlled by a programmable unijunction transistor 306, the gate electrode of which is connected to a potentiometer 308 through a diode 310 and the anode of which is connected to a capacitor 312 through a conductor 314. The capacitor 312 is identical to the capacitive portion of the RC circuit described in conjunction with FIGS. 2 and 3 for the preslope and heat control portions of the charging cycle.

The capacitor 312 is charged through either a preslope circuit 316 or a heat control circuit 318, the charging circuit for the preslope circuit being from an input conductor 320 through a variable resistor 322, a fixed resistor 324 and a diode 326. On the other hand, the heat control circuit is also provided a source of energy from the weld conductor 320 through a variable resistor 328, a fixed resistor 330 and a diode 332. This system differs some what from the other two systems of FIGS. 2 and 3 in that the weld signal is fed directly to the timing circuit by means of the conductor 320. Thus, as soon as the weld signal is received, current will flow through the respective charging circuit which has been enabled. The weld signal is also fed to the input of a delayed firing circuit 336 which includes a fixed resistor 338, a variable resistor 340 and a capacitor 342. The resistor 338, 340 and the capacitor 342 from an RC timing circuit having a time constant equivalent to 87 ½°. When the voltage on capacitor 342 is sufficiently high, a four-layer device 344 is broken down to provide current to a normally non-conductive transistor 346. This current through transistor 346 causes the transistor to conduct.

The circuit controls the operation or selection of the particular timing circuit 316, 318 as was described in conjunction with FIGS. 2 and 3. Thus, for the first half cycle, the system selects the preslope circuit 316 until such time as the 87 ½° is generated. Subsequently, the circuit switches the control circuits from the preslope to the heat control circuit 318 to charge the capacitor 312 from the heat control circuit. For the second half cycle and all subsequent half cycles, the anode feedback signal controls the operation of the system.

Line synchronization for the circuit is provided by a transistor 350, the collector-emitter circuit of which is connected in parallel with capacitor 312 by means of conductors 352, 354 and a diode 356. The conduction of transistor 350 also insures that the programmable unijunction transistor 306 is non-conductive at the start of each voltage cycle or when the zero voltage crossover point is achieved. The zero voltage crossover point is sensed and an inverted signal, such as illustrated at 358, is fed to the input conductor 360. The 12 volt potential at conductor 364 is fed to a node 366 through a resistor 368 to raise the potential at node 366 slightly positive each time the zero voltage crossover point is achieved. This momentarily causes transistor 350 to conduct to discharge capacitor 312 and insure that programmable unijunction transistor 306 is non-conductive.

The selection of the preslope circuit 316 or the heat control circuit 318 is controlled by means of a pair of transistors 370, 372, the transistors 370, 372 being connected to be in opposite condition. For example, when transistor 370 is conductive, transistor 372 is non-conductive and vice versa. The base electrode to transistor 370 is connected to an anode feedback sensing system, such as described above, the circuit sensing the condition in which current is flowing. This signal is fed to the base electrode of transistor 370 by means of a conductor 374, resistor 376 and a diode 378. Thus, when current is flowing in the load circuit, which occurs after firing and up to the zero current crossover point, the transistor 370 is off. On the other hand, the transistor 370 is on when current is flowing on the load circuit. When transistor 370 is off, transistor 372 will be conductive which occurs after the zero current crossover point. The transistor 372 is off during the period between the zero voltage crossover point and the zero current crossover point or the preslope portion of the cycle. The non-conduction of transistor 372 back biases a diode 384 to enable the preslope circuit 316.

When the transistor 370 is off, the collector electrode thereof is raised to a positive potential to back-bias a diode 380 and thereby enable the heat control portion of the heat control circuit 318. On the other hand, when the transistor 370 is on, the heat control circuit 318 is grounded through the collector-emitter circuit thereof.

As described above, the transistor 346 is non-conductive until such time as the 87 ½° point is reached. The non-conduction of transistor 346 causes the collector electrode thereof to rise to a positive potential, this signal being fed to the base electrode of transistor 370 through a resistor 386. This non-conductive condition of transistor 346 feeds a signal to the transistor 370 to hold transistor 370 conductive during the period that the 87 ½° signal has not been achieved for the first half cycle. Upon the generation of the 87 ½° cycle period, and thus the breakdown of four-layer device 344, the transistor 346 will be rendered conductive to place transistor 370 under the influence of the anode feedback signal at terminal 374. Also, the first non-conductive condition of transistor 346 in the first half cycle will turn transistor 370 off at the 87 ½° point to signal the generation of the 87 ½° point. This coincides with the assumption that the load circuit is purely inductive.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a resistance welding system for selectively connecting a load having a power factor to a source of alternating voltage during each of at least certain of the half-cycles of the alternating voltage for each weld, a method of controlling the welding system comprising the steps of sensing the power factor of the load, controlling the connection of the load to the source by generating a curve having a selectably variable slope characteristic, initiating the generation of the preselectable slope timing curve for selecting the percent heat fed to the load, and disabling the power factor sensing system during a selected portion of the first half-cycle of the weld, connecting the load to the source during each of a succession of half-cycles of the source and sensing the power factor of the load during each of a plurality of the half-cycles subsequent to the first half-cycle during a single weld.

2. A method according to claim 1 further including producing a signal indicative of the power factor of the load, and controlling the percent heat application in response to the signal.

3. A method according to claim 2 wherein the signal is indicative of the termination of the flow of current through the load.

4. A method according to claim 3 wherein the signal is indicative of the voltage across the device.

5. A method according to claim 4 further including selectively actuating the controllable rectifier device a selectable interval after initiation of timing, and controlling the initiation of timing in response to the signal.

6. A method according to claim 5 wherein said method includes simulating a substantially purely inductive load for the first half-cycle thus simulating a substantially 90° power factor when the power factor sensing is disabled.

7. A method according to claim 6 further including actuating the devices by applying a pulse of electrical energy thereto, and disabling the transmission of the pulse until the preselected signal is received.

8. A method according to claim 7 further including delaying actuation of the devices for a selectable period following the initiation of timing.

9. A method according to claim 1 further including comparing the magnitude of the timing curve to a fixed level and generating an output signal when said timing curve bears a preselected relationship to said fixed level.

10. A resistance welding control system for selectively connecting a load having a power factor to a source of alternating voltage during each of at least certain of the half-cycles of the alternating voltage for each weld, said system including a sensing means for sensing the power factor of the load, heat control means including a timing curve generating means controlled by the sensing means for controlling the connection of the load to the source, said curve generating means generating a curve having a preselectable constant characteristic portion and a portion having a selectably variable slope characteristic, said sensing means initiating the generation of the preselectable characteristic timing portion by the generating means, means for selecting the variable slope and, thus, selecting the percent heat fed to the load, and means for disabling the power factor sensing means during the first half-cycle of the weld.

11. A resistance welding control system according to claim 10 wherein the load is connected to the source during each of a succession of half-cycles of the source and in which the sensing means senses the power factor of the load during each of a plurality of the half-cycles during a single weld.

12. A resistance welding control system according to claim 10 wherein the sensing means produces a signal indicative of the power factor of the load, and in which the heat control means is responsive to the signal.

13. A resistance welding control system according to claim 12 wherein the load is connected to the source during each of a succession of the half-cycles of the source and in which the sensing means produces a signal indicative of the power factor of the load during each of a plurality of said half-cycles during a single weld.

14. A resistance welding control system according to claim 10 wherein the succession of half-cycles includes half-cycles of both polarities.

15. A resistance welding control system according to claim 14 wherein the signal is indicative of the termination of the flow of current through the load.

16. A resistance welding control system according to claim 15 wherein the control system includes a controlled rectifier device controlled by the heat control means and in which the sensing means senses the voltage across the device.

17. A resistance welding control system according to claim 16 wherein the controlled rectifier device is rendered conductive and non-conductive in periodic relation with the source and in which the signal indicative of the power factor of the load is transmitted when the controlled rectifier device becomes non-conductive.

18. A resistance welding control system according to claim 17 wherein the controlled rectifier device is a pair of to back connected controlled rectifier devices which are alternately conductive.

19. A resistance welding control system according to claim 18 wherein the controlled rectifier devices are rendered conductive during alternate half-cycles of the source voltage with each becoming non-conductive before the other becomes conductive, and in which the signal indicative of the power factor of the load is transmitted when either of the controlled rectifier devices becomes conductive.

20. A resistance welding control system according to claim 19 wherein the controllable rectifier device is effective upon actuation to connect a source of pulsating electrical energy to a welding load having an inductive reactance, and timing means for selectively actuating the controllable rectifier device a selectable interval after initiation of timing, and means controlled by the sensing means for initiating the selectable characteristic portion of the timing.

21. A resistance welding control system according to claim 20 wherein controllable rectifier means is actuated during each of certain of the pulsations of the source.

22. A resistance welding control system according to claim 21 wherein the timing means actuates the rectifier devices during opposite half-cycles of the alternating current source.

23. In a resistance welding system for selectively connecting a load having a power factor to a source of alternating voltage during each of at least certain of the half-cycles of the alternating voltage for each weld, a method of controlling the welding system comprising the steps of sensing the power factor of the load, and producing a signal indicative of the power factor of the load, controlling the connection of the load to the source by generating a curve having a selectably variable slope characteristic in response to said signal, initiating the generation of the preselectable slope timing curve for selecting the percent heat fed to the load, and disabling the power factor sensing system during a selected portion of the first half cycle of the weld.

* * * * *